3,267,696
VIBRATION ISOLATION COUPLING
Chester E. Sieja, Saginaw, Mich., assignor to General Motors Corporation, Detroit, Mich., a corporation of Delaware
Filed May 14, 1964, Ser. No. 367,314
2 Claims. (Cl. 64—11)

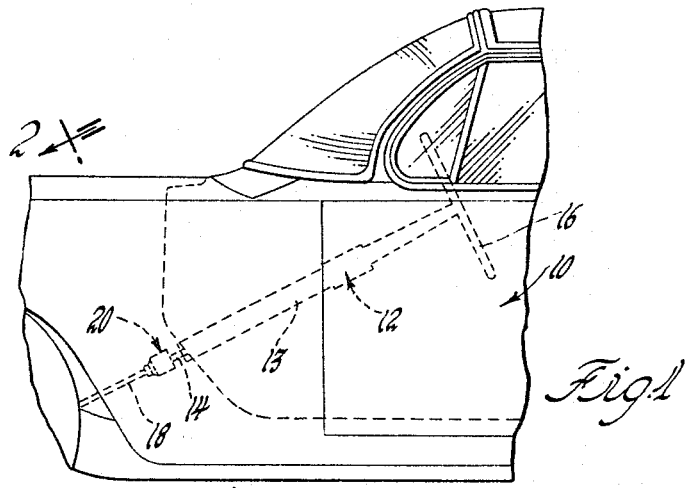
Fig. 1
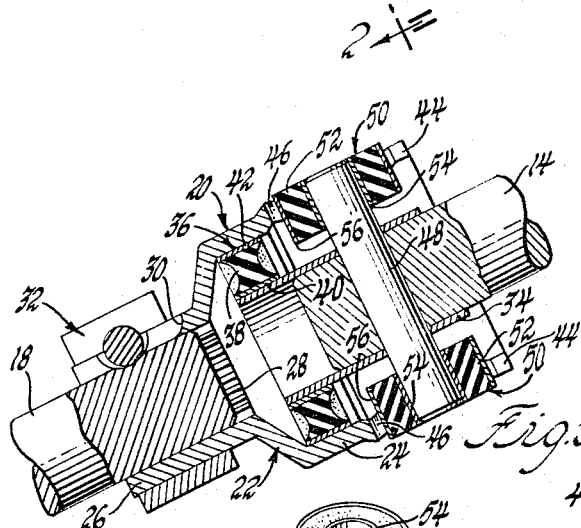
Fig. 3
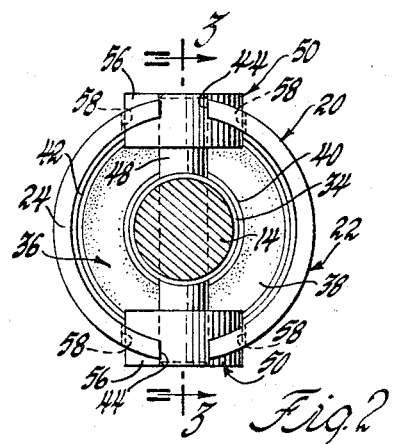
Fig. 2
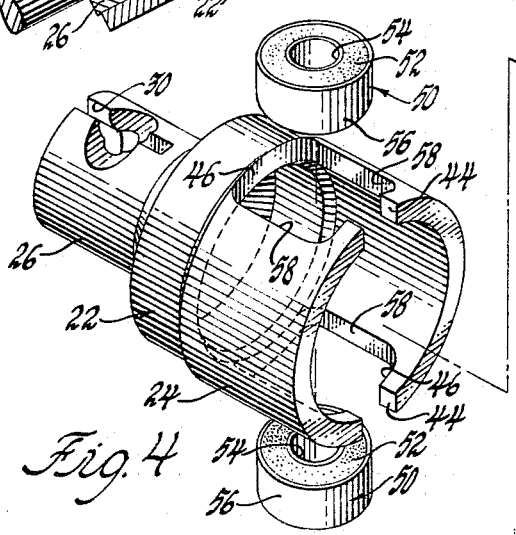
Fig. 4
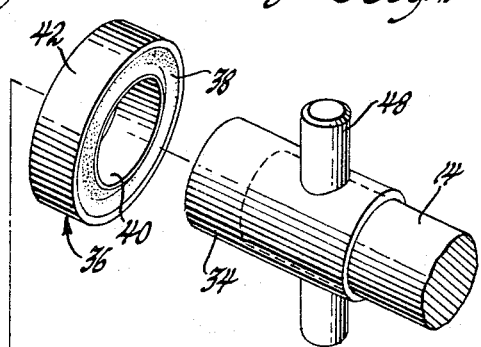
INVENTOR.
Chester E. Sieja
BY
W. S. Pettigrew
ATTORNEY

United States Patent Office 3,267,696
Patented August 23, 1966

This invention relates to couplings and more particularly to isolation couplings.

One feature of this invention is that it provides a new and improved isolation coupling. Another feature of this invention is that it provides a new and improved isolation coupling for a pair of relatively movable members wherein the members are interconnected by first isolation coupling means and located thereby, when the members are unloaded, in a substantially nondrivingly connected neutral relation, with second isolation coupling means being provided to resiliently drivingly connect the members when they are loaded and moved a predetermined extent from the neutral relation thereof. A further feature of this invention is that the first isolation coupling means, while being of sufficient stiffness to locate the members in the neutral relation thereof when relatively unloaded, are yet sufficiently resilient to efficiently isolate the members against transmitted vibration, with still further highly efficient vibration isolation being provided by the second isolation coupling means when the members are drivingly connected.

These and other features and advantages of this invention will be readily apparent from the following specification and drawings wherein:

FIGURE 1 is a fragmentary elevational view of a vehicle body provided with a steering shaft including an isolation coupling according to this invention;

FIGURE 2 is an enlarged sectional view of the coupling taken generally along the plane indicated by line 2—2 of FIGURE 1;

FIGURE 3 is a sectional view taken generally along the plane indicated by line 3—3 of FIGURE 2; and FIGURE 4 is an exploded perspective view.

Referring now to FIGURE 1 of the drawings, a vehicle body 10 is provided with a steering column assembly 12 including a mast jacket 13, an upper steering shaft 14 rotatably mounted within the mast jacket and mounting at its upper end a steering wheel 16, and a lower steering shaft 18 suitably drivingly connected to the vehicle steering gear, not shown. An isolation coupling 20 according to this invention interconnects the upper and lower shafts 14 and 18.

As best seen in FIGURES 3 and 4, coupling 20 includes a member 22 having a main generally cup-shaped body portion 24 and an annular flange portion 26. Flange 26 is internally splined as indicated at 28 and engaged with complementary splines adjacent the upper end of shaft 18 to nonrotatably mount member 22 on the shaft. Flange 26 is further partially slotted at 30 so as to be compressively clamped over lower shaft 18 against movement axially thereof by a suitable adjustable clamp assembly 32.

The lower end of upper shaft 14 has a connecting sleeve 34 press-fitted thereon, and this assembly is received within body portion 24 in generally concentric relation therewith. Member 22 and sleeve 34 are resiliently interconnected by a bushing assembly 36 comprising a bushing 38 of suitable elastomeric material bonded to inner and outer metal sleeves 40 and 42 which are press-fitted respectively over sleeve 34 and within body portion 24.

As shown in FIGURE 3, body portion 24 includes a pair of diametrically opposite slots 44 each opening to an aperture 46. A mounting pin 48 secured within upper shaft 14 and sleeve 34 extends radially therefrom to have the ends located within apertures 46. Mounted on the ends of pin 48 are a pair of coupling button assemblies 50, each comprising a bushing 52 of suitable elastomeric material bonded to inner and outer metal sleeves 54 and 56, inner sleeve 54 being press-fitted over the end of pin 48. As will be set out below, button assemblies 50 are adapted to engage aperture side walls 58 of member 22 and drivingly connect upper and lower shafts 14 and 18 upon rotation of one relative to the other.

As best seen in FIGURE 2, button assemblies 50 are each of a diameter slightly less than the chordal distance across respective apertures 46. When the upper and lower shafts 14 and 18 are in a neutral relation, as shown, each button assembly 50 is located out of engagement with side walls 58 and is engageable therewith only after approximately 2° of relative rotation in either direction between upper and lower shafts 14 and 18. The neutral relation shown occurs, of course, when the shafts are both in an unloaded condition, for example, when there is no torque applied to the steering wheel to actuate the steering gear. In this condition, bushing 36 is substantially torsionally relaxed, and of course resists any torsional or other forces disturbing this relaxation so as to serve as means for locating upper and lower shafts 14 and 18 in neutral relation. However, the bushing is of insufficient stiffness to itself transmit any appreciable steering torque between the shafts, so that in this neutral relation, they are substantially nondrivingly connected. When upper shaft 14 is rotated in either direction upon the application of appreciable steering torque to steering wheel 16, bushing 38 is torsionally deformed and button assemblies 50 are compressively engaged with adjacent side walls 58 sufficiently to transmit steering torque to member 22, lower shaft 18, and the steering gear.

In the neutral nondrivingly connected relation of the upper and lower shafts 14 and 18, bushing 38 efficiently isolates upper shaft 14 from torsional, bending, and longitudinal modes of vibration emanating from the steering gear, and this isolation prevails even after being torsionally deformed under steering torque. Although bushings 52 are sufficiently stiff to provide the necessary rigidity in the steering train, they also provide additional damping or isolation between upper and lower shafts 14 and 18 when compressively engaged against member 22 under steering torque. It has been found that for the purposes herein described, 70 durometer neoprene is satisfactory for bushing 38, and 40 durometer neoprene is satisfactory for bushings 52, the higher durometer of bushing 38 owing to the fact that it is torsionally loaded whereas bushings 52 are loaded in compression. Further, by forming bushing 38 with concave side walls, additional isolation effects are obtained in all modes.

Although, by virtue of the flexible bushing 38, upper and lower shafts 14 and 18 may be coupled in a relation wherein they are disposed angularly with respect to each other's centerline, it is desirable to limit such angularity to approximately 5° to obtain the best isolation effects from the bushing.

Thus a new and improved isolation coupling is provided.

I claim:
1. An isolation coupling, comprising, inner and outer concentrically arranged and relatively rotatable members, one of said members including a generally cup-shaped portion receiving an end of the other of said members, an elastomeric isolation bushing interconnecting said end of said other member and said cup-shaped portion, a pair of diametrically opposed openings in said cup-shaped portion mounting pin means extending radially from said other member adjacent said end thereof and having a pair of end portions each respective to one of said openings, and a pair of elastomeric isolation coupling buttons each mounted on a respective said end portion within said respective opening and engageable with said cup-shaped portion, said bushing normally locating said members in a substantially nondrivingly connected neutral relation wherein said buttons are located out of engagement with said cup-shaped portion, said buttons engaging said cup-shaped portion upon predetermined relative rotation between said members from said neutral relation to establish resilient driving connection therebetween.

2. An isolation coupling as recited in claim 1 wherein said mounting pin means is a single pin extending radially through said other member and having its ends located in said openings, and wherein said buttons each take the form of an annulus received on a respective end of the pin for radial compressive engagement between the pin and said cup-shaped portion.

References Cited by the Examiner
UNITED STATES PATENTS

| | | | |
|---|---|---|---|
| 2,554,311 | 5/1951 | Place | 64—10 X |
| 2,641,910 | 6/1953 | Riopelle et al. | 64—10 X |
| 2,869,340 | 1/1959 | Saberton | 64—11 |
| 3,023,593 | 3/1962 | Nallinger | 64—27 |
| 3,149,481 | 9/1964 | Peirce | 64—14 |

FOREIGN PATENTS 818,803  8/1959  Great Britain.

FRED C. MATTERN, JR., *Primary Examiner.*

HALL C. COE, *Examiner.*